United States Patent
Molina et al.

(10) Patent No.: US 12,322,984 B1
(45) Date of Patent: Jun. 3, 2025

(54) INTEROPERABLE WIRELESS CHARGING WITH POLYPHASE COIL NETWORK

(71) Applicants: Bayerische Motoren Werke Aktiengesellschaft, Munich (DE); UT-Battelle, LLC, Oak Ridge, TN (US)

(72) Inventors: Vincent Molina, Menlo Park, CA (US); Bernhard Hoess, Munich (DE); Mostak Mohammad, Knoxville, TN (US); Omer Onar, Knoxville, TN (US); Stephan Peuckmann, Munich (DE); Michael Saegmueller, Karlsfeld (DE); Stefan Weindl, Holzkirchen (DE); Juntao Zhu, Munich (DE)

(73) Assignees: Bayerische Motoren Werke Aktiengesellschaft, Munich (DE); UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 18/442,932

(22) Filed: Feb. 15, 2024

(51) Int. Cl.
*H02J 50/40* (2016.01)
*H02J 50/10* (2016.01)

(52) U.S. Cl.
CPC ............ *H02J 50/402* (2020.01); *H02J 50/10* (2016.02)

(58) Field of Classification Search
CPC ................................ H02J 50/402; H02J 50/10
USPC .......................................................... 307/104
See application file for complete search history.

(56) References Cited

U.S. PATENT DOCUMENTS

| | | | | |
|---|---|---|---|---|
| 8,242,741 | B2* | 8/2012 | Phelps, III | H02J 50/10 |
| | | | | 320/108 |
| 8,742,625 | B2* | 6/2014 | Baarman | H02J 50/402 |
| | | | | 307/104 |
| 9,054,542 | B2* | 6/2015 | Baarman | H02J 50/12 |
| 9,837,204 | B2* | 12/2017 | Widmer | H02J 7/00034 |
| 9,859,707 | B2* | 1/2018 | Corum | H01P 3/00 |
| 10,122,212 | B2* | 11/2018 | Jeong | H02J 50/12 |
| 10,355,526 | B2* | 7/2019 | Madawala | B60L 55/00 |
| 2018/0233953 | A1* | 8/2018 | Thrimawithana | H02J 50/402 |
| 2021/0384770 | A1* | 12/2021 | Thrimawithana | H02J 50/402 |
| 2023/0163617 | A1* | 5/2023 | Brohlin | H02J 50/12 |
| | | | | 307/104 |

FOREIGN PATENT DOCUMENTS

WO WO 2020/142621 A2 7/2020

OTHER PUBLICATIONS

Shiihara, Y. et al., "Three-Phase Contactless Power Transformer With Magnet Yoke," 19th International Conference on Electrical Machines and Systems (ICEMS), 2016 (4 pages).

(Continued)

*Primary Examiner* — Alfonso Perez Borroto
(74) *Attorney, Agent, or Firm* — Crowell & Moring LLP

(57) ABSTRACT

A wireless power transfer (WPT) device includes a polyphase coil network comprising a plurality of phases for transfer of high-frequency AC power, each one of the plurality of phases comprising a phase coil, wherein the polyphase coil network is configured to operate in a polyphase configuration to enable transfer of polyphase high-frequency AC power with a mating WPT device operating in a polyphase mode; and operate in a single phase interoperability configuration to enable transfer of single phase high-frequency AC power with a mating WPT device operating in a single phase mode.

22 Claims, 14 Drawing Sheets

(56) References Cited

OTHER PUBLICATIONS

Matsumoto, H. et al., "Trifoliate Three-Phase Contactless Power Transformer in Case of Winding-Alignment," IEEE Transactions on Industrial Electronics, 2014, vol. 61, No. 1, pp. 53-62 (10 pages).
Liu, Y. et al., "Novel Output Regulation Method for Three-Phase Three-level Wireless EV Charging System," IEEE Transactions on Magnetics, 2022, vol. 58, No. 2, (7 pages).
Colussi, J. et al., "100 kW Three-Phase Wireless Charger for EV: Experimental Validation Adopting Opposition Method," energies, 2021, vol. 14, No. 8, pp. 1-18 (18 pages).

* cited by examiner

INTEROPERABLE WIRELESS CHARGING WITH POLYPHASE COIL NETWORK

STATEMENT REGARDING FEDERALLY SPONSORED RESEARCH AND DEVELOPMENT

The technologies described herein were developed with government support under Contract No. DE-AC05-00OR22725 awarded by the U.S. Department of Energy. The government has certain rights in the described technologies.

BACKGROUND

Electric vehicles (EVs) and plug-in hybrid vehicles are increasingly commonplace. One primary component of an EV is the battery which must be charged. Some EVs and plug-in hybrid vehicles may be charged using wireless inductive power transfer based charging systems. Wireless inductive power transfer based charging systems use electromagnetic induction to transmit power from a transmitter coil to a receiver coil located on or inside the vehicle (e.g., on an underside of the vehicle). High frequency power is transferred from the transmitter coil to the receiver coil through a large airgap and is fed from the receiver coil to a rectifier which charges the battery. Both the transmitter and receiver coils may have compensation networks which reduce the reactive power requirement and improve efficiency. The distance between the transmitter and receiver coils ranges from several to hundreds of millimeters, and the power level is often in the order of kilo-Watts. Wireless charging eliminates the need for cables and connectors, and may enable more frequent and convenient charging the range anxiety.

Wireless charging may be conducted using either single phase technology or polyphase technology. When using single phase technology, a single phase of oscillating electromagnetic energy is the output from a transmitter coil (e.g., in a sin wave), which creates a magnetic field that generates (e.g., induces) a voltage in a nearby corresponding receiver coil. When using polyphase technology, multiple phases of oscillating electromagnetic energy are output from multiple transmitter coils in a rotating manner for constant power transfer, e.g., three phases, requiring at least three separate phase coils. The timing of the signals in the multiple phases may be evenly spaced in time through the cycle, e.g., three phases may utilize 120° angular spacing through the oscillation cycle. While requiring more coils and additional technology, wireless charging using polyphase technology generally provides for a higher power density transfer due to an improved space-time utilization of the magnetic field between the transmitter and receiver coils.

SUMMARY

At present, single phase wireless charging systems and polyphase wireless charging systems are not optimally or efficiently interoperable with each other. That is, using previously known technology, a single phase transmitter (e.g., circular, square, rectangular geometries) is not optimally or efficiently interoperable with a polyphase receiver. Due to the anticipated increase in polyphase wireless charging systems, e.g., for EV charging, and given the current prevalence of single phase wireless charging systems (both transmitters and receivers), a desire exists to develop a new system that is capable of interoperating with mating single phase wireless charging systems and mating polyphase wireless charging systems.

To address these and other concerns, improved wireless power transfer (WPT) devices and systems are disclosed that are capable of operating with mating WPT devices operating in a polyphase mode or in a single phase mode. Additionally, corresponding methods for wireless power transfer are also disclosed.

In accordance with various embodiments, a wireless power transfer (WPT) device includes a polyphase coil network comprising a plurality of phases for transfer of high-frequency AC power, each one of the plurality of phases comprising a phase coil, wherein the polyphase coil network is configured to operate in a polyphase configuration to enable transfer of polyphase high-frequency AC power with a mating WPT device operating in a polyphase mode; and operate in a single phase interoperability configuration to enable transfer of single phase high-frequency AC power with a mating WPT device operating in a single phase mode.

In accordance with various embodiments, a method for wireless power transfer (WPT) between a first WPT device and a second WPT device, wherein the first WPT device includes a polyphase coil network, includes determining, by the first WPT device whether the second WPT device is operating in a polyphase mode or a single phase mode. The method may also include operating the polyphase coil network of the first WPT device in a polyphase configuration to enable transfer of polyphase high-frequency AC power with the second WPT device in response to determining that the second WPT device is operating in the polyphase mode. The method may also include operating the polyphase coil network of the first WPT device in a single phase interoperability configuration to enable transfer of single phase high-frequency AC power with the second WPT device operating in the single phase mode.

In accordance with the various embodiments disclosed herein, the disclosed technologies enable interoperability of polyphase and single phase wireless power transfer systems, allowing for the higher power density transfer capabilities of polyphase wireless charging when available, while ensuring backwards compatibility with single phase wireless power transfer systems.

Other objects, advantages and novel features of the present disclosure will become apparent from the following detailed description of one or more preferred embodiments when considered in conjunction with the accompanying drawings.

DETAILED DESCRIPTION OF THE DRAWINGS

Figure 1:
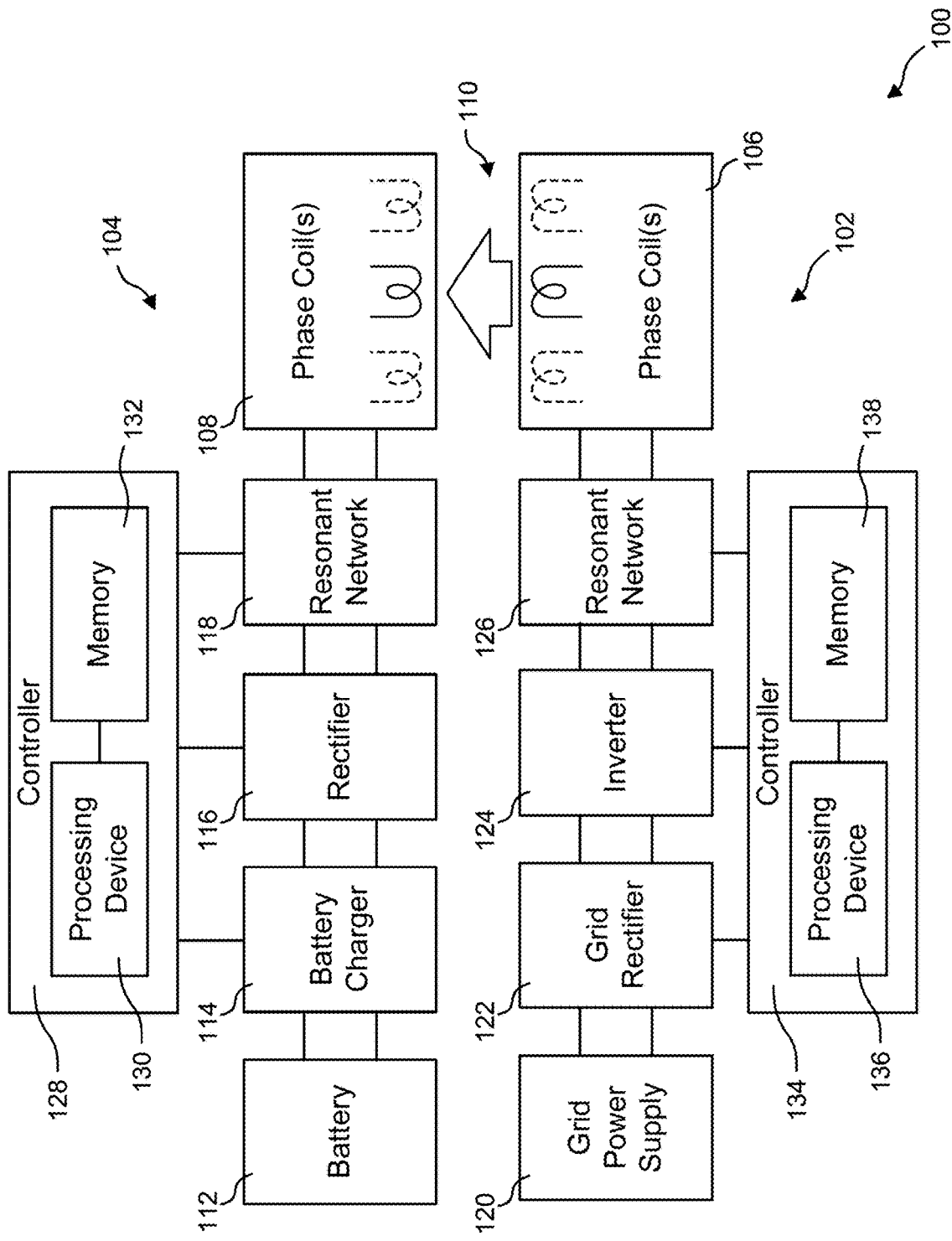
FIG. 1 illustrates a schematic diagram of a wireless power transfer (WPT) system in accordance with various embodiments.

FIG. 1 illustrates an example schematic diagram of a wireless power transfer (WPT) system 100, including a first WPT device 102 and a second WPT device 104, in accordance with various embodiments. The first WPT device 102 is a transmitter WPT device, and the second WPT device 104 is a receiver WPT device in this example. The first WPT device 102 may include a first set of one or more phase coil 106, while the second WPT device 104 may include a second set of one or more phase coils 108. In this example, the second set of phase coil(s) 108 may be configured to receive high-frequency AC power (e.g., in a vertical direction) from the first set of phase coil(s) 106. For example, transmitter phase coil(s) 106 may be placed on the ground or other surface below the receiver phase coil(s) 108, however, other arrangements are contemplated. A gap 110 may exist between the first set of phase coil(s) 106 and the second set of phase coil(s) 108. The high-frequency AC power is transmitted from the transmitter coil(s) 106 to the set of at least one phase coil(s) 108 functioning as one or more receiver coil(s) through this gap 110. Generally, in various embodiments discussed below, the first or set of phase coil(s) 106 or 108 are arranged in a single phase arrangement, or in a polyphase arrangement. Further, the first or set of phase coil(s) 106 or 108 are arranged in at least one of a single layer, a double layer, or a triple layer, depending on the configuration and number of phases. One objective of the present disclosure is to disclose systems and methods that enable the interoperability of such varying phase coil arrangements, particularly enabling the interoperability of single phase and polyphase WPT systems.

In certain embodiments, the first WPT device 102 and the second WPT device 104 may each include a resonant network 118, 126 (also called a compensation network, tuning network, or a compensation circuit). Various known circuit configurations for resonant networks 118, 126 are contemplated, and generally include one or more capacitors and/or inductors electrically connected in series and/or parallel with the phase coil(s) 106 or 108 functioning as the transmitter or the receiver. The resonant networks 118, 126 serve to reduce the reactive power requirement and to improve efficiency of the wireless charging. In embodiments where more than one phase coil 106 or 108 are utilized as receiver or transmitter coils, each coil may have its own associated resonant network 118, 126, or may share resonant networks 118, 126 with other phase coils. Many options are contemplated and are illustrated herein.

In various embodiments, the first WPT system 102 (e.g., transmitter side) may include a grid power supply 120, for example, to provide power from a power grid. A grid rectifier 122 may convert the grid AC power to DC power. An inverter 124 may then convert the DC power into high-frequency AC power for transmission to the second set of one or more coil(s) 108 (e.g., receiver coils). The transmitter side also includes the first set of one or more phase coil(s) 106 of the transmitter, which may also be connected to a resonant network 126.

In various embodiments, the first set of phase coil(s) 106 (e.g., transmitter coils) provide a single phase high-frequency AC power. However, in other embodiments, multiple transmitter coil(s) 106 (e.g., at least three) are provided to provide a polyphase high-frequency AC power. In various embodiments, the transmitter coil(s) 106 are a circular coil, a rectangular coil, or a DD coil, and may include a ferrite core backplate. The transmitter coil(s) 106 may have an AC power transmission axis predominantly parallel to the vertical direction in some embodiments (e.g., when used on the ground). However, in other embodiments, the transmitter coil(s) 106 may have an AC power transmission axis predominantly parallel to the horizontal direction (e.g., when used facing sideways). In particular examples, the high-frequency AC power is in a range of 5-50 kW (which may be lower or higher in other examples), and may have a fundamental frequency at 10's of kHz, and may be in a range of 3 kHz-10 MHz, with 20 kHz as a particular example.

In various embodiments, the second WPT device 104 (e.g., receiver WPT device in this example) includes a rectifier 116 electrically coupled through the resonant network 118 to the set of one or more phase coils 108. The rectifier 116 may be configured to rectify the high-frequency AC power received by the phase coil(s) 108, and output the rectified high-frequency AC power as DC power to an on-board battery charger 114 or directly to the battery 112. The on-board battery charger 114 may be configured to receive the DC power from the rectifier 116 and to charge at least one battery 112 using the DC power.

The first WPT device 102 may include a controller 134, which may further include at least one processing device 136 coupled to a memory device 138. Similarly, the second WPT device 104 may also include a controller 128, which may further include at least one processing device 130 coupled to a memory device 132. The controller 128, 134 may be a single controller or may be implemented across a plurality of different controller modules. The controller 128, 134 may be, in part, implemented as part of an inverter controller, a battery charger controller, an ECU, or may be a dedicated wireless power transfer controller. The processing device 130, 136 may be a Central Processing Unit (CPU), a Digital Signal Processor (DSP), a microcontroller, or a microprocessor, and/or may include or be implemented with an Application Specific Integrated Circuit (ASIC), Programmable Logic Device (PLD), or Field Programmable Gate Array (FPGA). The processing device 130, 136 and/or the controller 128, 134 as a whole may also be implemented with circuitry that includes discrete logic or other circuit components, including analog circuit components, digital circuit components or both. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples. The memory 132, 138 may comprise a flash memory, a Random Access Memory (RAM), a Read Only Memory (ROM), an Erasable Programmable Read Only Memory (EPROM), a Hard Disk Drive (HDD), other magnetic or optical disk, or another machine-readable nonvolatile medium or other tangible storage mediums other than a transitory signal. The memory 132, 138 may store therein software modules, code, and/or instructions that, when executed by the processing device 130, 136, cause the processing device 130, 136 to implement some or all of the processes described herein or illustrated in the drawings. The memory 132, 138 may also store other data for use by the processing device 130, 136 and/or historical information regarding the operation of the controller 128, 134, other components, and or the vehicle as a whole.

In various embodiments, the at least one processing device 130, 136 may be configured to determine that the at least one phase coil 106, 108 is adjacent to at least one a mating coil of a mating WPT device that transmits or receives high-frequency AC power. For example, the processing device 130, 136 may utilize sensors to sense the high-frequency AC power from the transmitter coil 106. The processing device 130, 136 may periodically or cyclically detect, through the at least one phase coil 108, whether the high-frequency AC power from the transmitter coil 106 is present on or received by (e.g., above a threshold amount) the phase coil(s) 108. In some embodiments, the first or second WPT system 102, 104 includes a coil detection system including an additional sensing coil and communications devices in each of the transmitter and the receiver side. In such embodiments, the wireless power transfer happens only when the transmitter side detects the presence of a compatible receiver (e.g., receiver coil 108) via the additional sensing coil. Upon detection, both the transmitter (e.g., the first WPT device 102) and the receiver (e.g., the second WPT device 104) exchanges information about their configurations, such as topology, single or polyphase WPT, voltage levels, required voltage, and current to charge the battery, etc. Once the communications are complete and compliant, the transmitter will start switching its high-frequency inverter (e.g., inverter 124) and sending the high-frequency AC power.

Additionally, one or both of the processing devices 130, 136 of the controllers 128, 134 may be configured to determine whether a mating WPT device is operating in a single phase mode or a polyphase mode. That is, the processing device 130 of the controller 128 of the second WPT device 104 (e.g., the receiver WPT device) may be configured to determine whether the mating first WPT device 102 (e.g., the transmitter WPT device) is operating in, or is capable of operating in, a polyphase or a single phase mode—that is, whether the transmitter WPT device is configured to output wireless power in a single phase or polyphase transmission. Similarly, the processing device 136 of the controller 134 of the first WPT device 102 (e.g., the transmitter WPT device) may be configured to determine whether the mating second WPT device 104 (e.g., the receiver WPT device) is operating in, or is capable of operating in, a polyphase or a single phase mode—that is, whether the receiver WPT device is configured to receive wireless power in a single phase or polyphase transmission mode.

In one embodiment, the processing device 130, 136 or the controller 128, 134 is configured to communicate with the mating WPT device to determine whether the mating WPT device is operating in, or is capable of operating in, the single phase mode or the polyphase mode. Such communication may be through nearfield wireless communications, such as radio frequency communications (e.g., utilizing a separate antenna or using the phase coils), audio communication, or optical communications. Similarly, the processing device 130, 136 or the controller 128, 134 may maintain or access a record of identifications of mating WPT devices which may be based on location (e.g., set locations for WPT transmitters) or based on some other identifying characteristic (e.g., based on identifying marks, license plates, identifiable models, colors, shapes, etc.). The processing device 130, 136 or the controller 128, 134 may access this record to determine whether the mating WPT device operates in a polyphase or single phase mode (as well as other information). In various embodiments, the processing devices 130, 136 or the controllers 128, 134 may be able to detect information on the mating WPT device that provides an indication of whether it can operate in the polyphase or single phase modes. For example, the mating WPT device may include symbols, text, or codes that indicate its operating mode.

In another embodiment, the processing device 130, 136 or the controller 128, 134 may be configured to measure a phase shift between the plurality of phases to determine whether the mating WPT device is operating in the single phase mode or the polyphase mode. If there is little to no phase shift between the plurality of phases, then the processing device 130, 136 or the controller 128, 134 may determine that the mating WPT device is operating in the single phase mode. Conversely, if a phase shift exists between the plurality of phases, then the processing device 130, 136 or the controller 128, 134 may determine that the mating WPT device is operating in the polyphase mode.

The processing devices 130, 136 may be operationally coupled to one or more switches disclosed herein and may be configured to operate the switches to open or close a connection to place the coils 106, 108 or WPT devices 102, 104 into different configurations. The processing devices 130, 136 may receive input information from other control systems within the vehicle in order to determine that the electric motor is stationary or has been disengaged from the vehicle's driving train (e.g., in park or neutral), e.g., to determine whether to place the vehicle in a charging mode.

Figure 2:
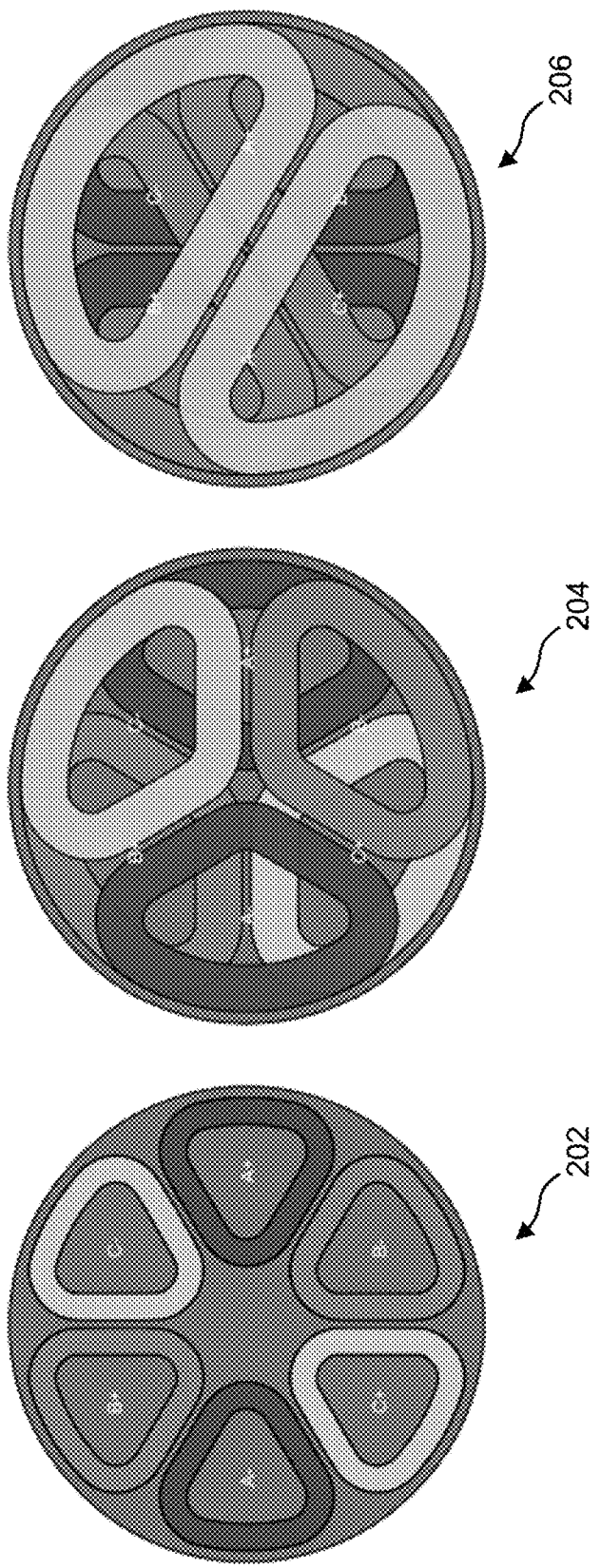
FIG. 2 illustrates different example configurations of sets of phase coils in accordance with various embodiments.

FIG. 2 illustrates different example configurations of sets of phase coils, which can be used either as a set of transmitter or receiver coils. The examples are each three-phase polyphase coils. Each example set of coils includes two coils for each phase, which are typically operated in a bipolar arrangement, meaning one coil for a phase operates in a first rotational direction (e.g., clockwise), while the other coil for that same phase operates in an opposite second rotational direction (e.g., counterclockwise). The first example polyphase coil 202 shows a single-layer polyphase bipolar arrangement of coils. The second example polyphase coil 204 shows a double-layer polyphase bipolar arrangement of coils. The third example polyphase coil 206 shows a triple-layer polyphase bipolar arrangement of coils.

Such polyphase bipolar coil arrangements are not interoperable with single phase unipolar WPT systems without any natural offset. For example, when these example polyphase bipolar coil arrangements are utilized on a receiver side and mated to a single phase unipolar transmitter coil, the current induced at alignment position in the two different coils for each phase will be oriented in opposite directions, thereby cancelling itself out and resulting in zero power transfer.

Figure 3:
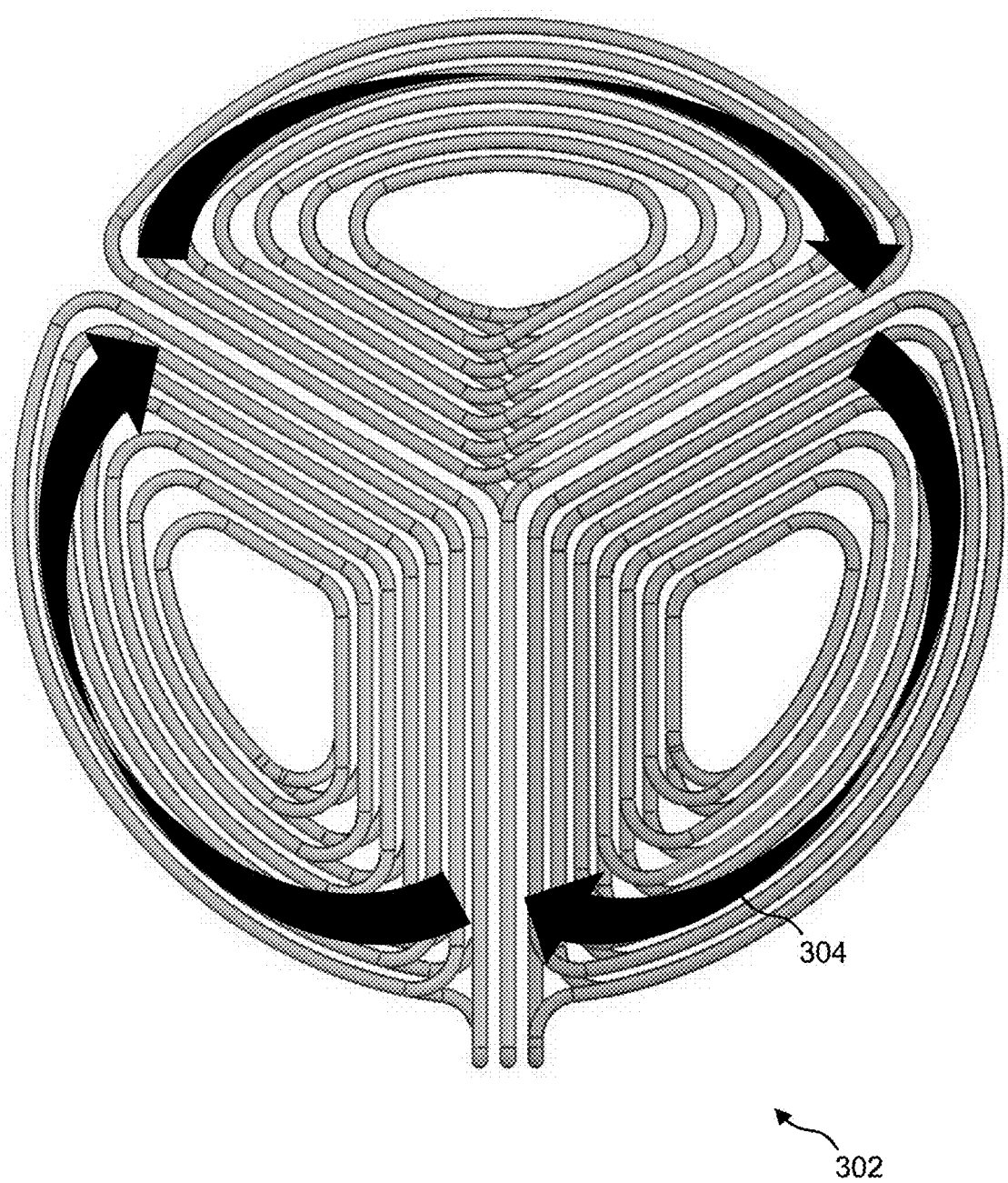
FIG. 3 illustrates an example polyphase unipolar coil network arrangement in accordance with various embodiments.

FIG. 3 illustrates an example polyphase unipolar coil network arrangement 302, which can be used either as a set of transmitter or receiver coils. In various embodiments, each phase coil of each one of the plurality of phases is unipolar. In this example, three phases are shown, wherein the individual coil for each phase occupies approximately one-third of the space of the overall coil arrangement in a single layer polyphase coil network. In this example, the polyphase coil network has a circular footprint layout, where each phase occupies approximately 120° of the circular footprint layout, and is arranged as a pie with 120° slices. However, many other configurations are possible, include square, rectangular, hexagonal, octagonal, oval, or any other overall shape. Additionally, the space for each individual phase coil does not need to be equally split, though in some embodiments they are (e.g., FIG. 3).

As is shown in FIG. 3, the polyphase unipolar coil arrangement 302 may orient the individual phase coils so that they are all aligned in a same rotational direction, that is, so that current is induced or flows in each coil in a same rotational direction (e.g., clockwise for a certain pulse in FIG. 3) in each phase coil. As is illustrated by the arrows 304 in FIG. 3, when mated with a single phase transmitter, at least the outer portions of the coils will have a relatively similar current induced therein in a same direction across all three phases. In various embodiments, the polyphase coil network (e.g., when operating as a receiver) may have a smaller footprint area than a coil network of a mating WPT device (e.g., when operating as the transmitter), and similarly, the polyphase coil network (e.g., when operating as a transmitter) may have a larger footprint area than a coil network of a mating WPT device (e.g., when operating as a receiver). However, in other embodiments, the opposite may be true, or the coil networks may similar or identical sizes.

Figure 4:
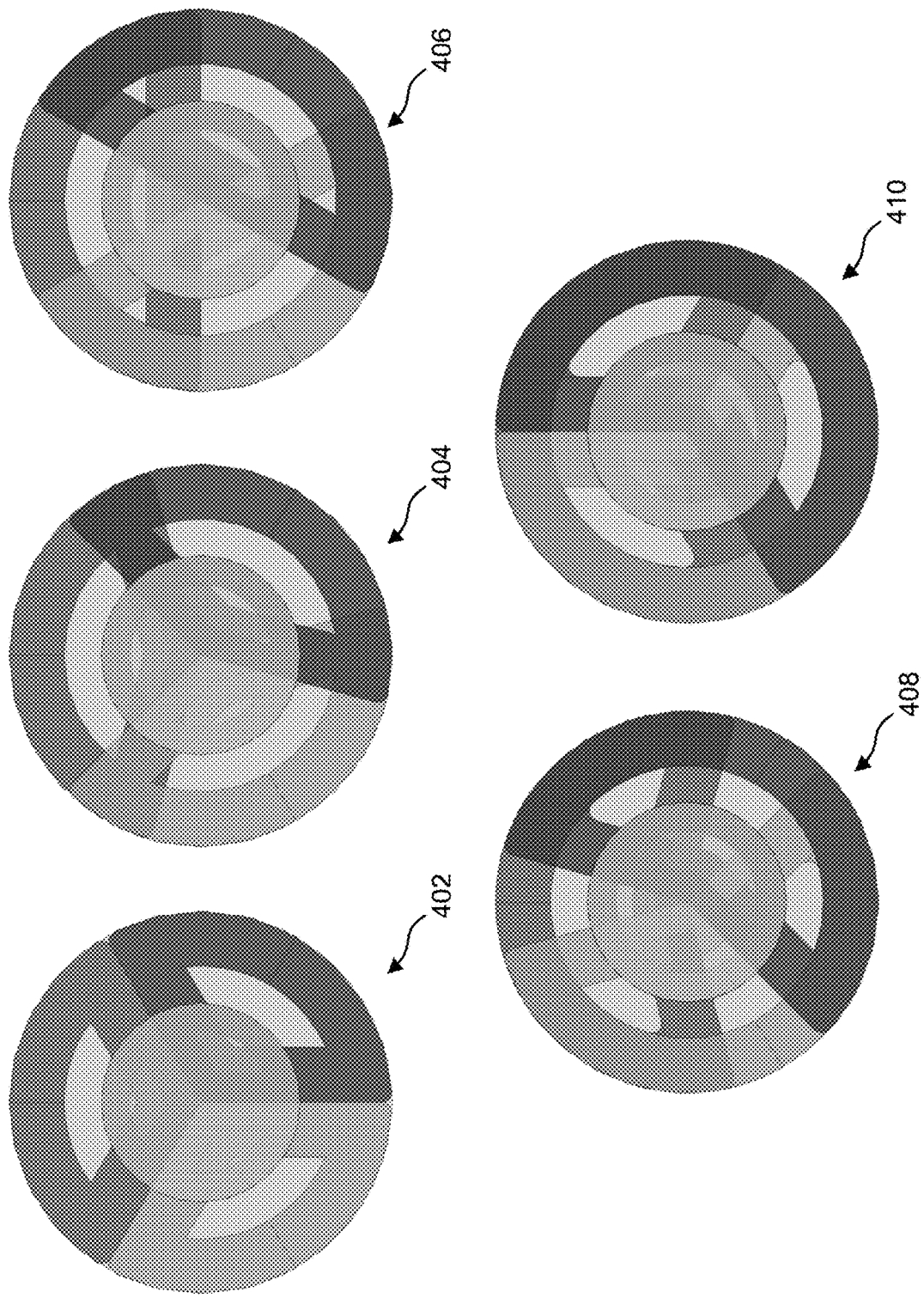
FIG. 4 illustrates variations on the polyphase unipolar coil arrangement in accordance with various embodiments.
Figure 5:
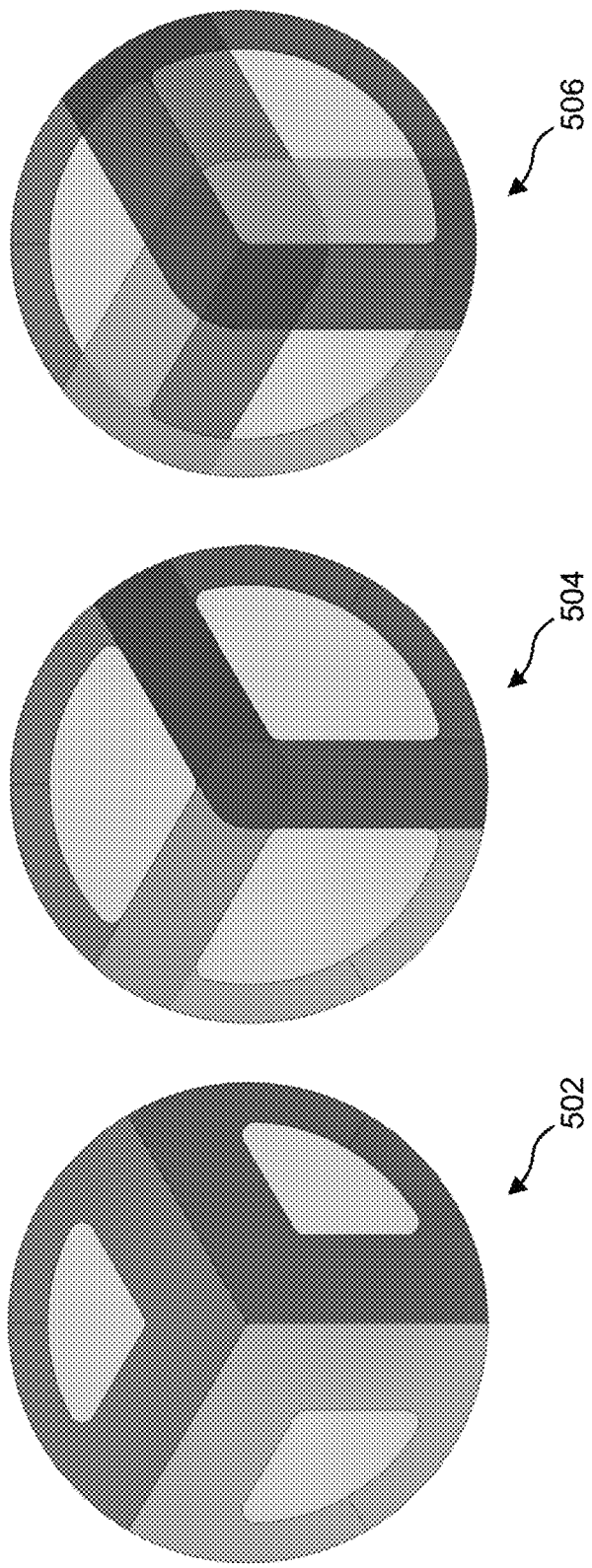
FIG. 5 illustrates variations on the polyphase unipolar coil arrangement in accordance with various embodiments.

FIGS. 4 and 5 illustrate variations on the polyphase unipolar coil arrangement 302 of FIG. 3. For example, FIG. 4 shows different angular arrangements of the coil arrangement. The first example 402 is essentially the same as the polyphase unipolar coil arrangement 302 of FIG. 3, where each phase coil occupies approximately 120° of the overall circular coil area, and is in a single layer. However, the other examples occupy more than 120° and are arranged in overlapping two-layer configurations. The second example 404 illustrates each phase coil occupying 150°, the third example 406 illustrates each phase coil occupying 180°, the fourth example 408 illustrates each phase coil occupying 210°, and the fifth example 410 illustrates each phase coil occupying 240°.

Similarly, FIG. 5 illustrates different overlapping arrangement variations on the polyphase unipolar coil arrangement 302 of FIG. 3. The first example 502 again is essentially the same as the polyphase unipolar coil arrangement 302 of FIG. 3, where the phase coils do not overlap. The second example 504 shows that portions of the phase coils overlap (e.g., along the legs that return toward the center). This arrangement actually requires three layers as the center space is occupied by all three phase coils. The third example 506 shows intertwined phase coils, where portions of the phase coils overlap and are intertwined. The intertwined phase coils example 506 may provide a highest power density, while the overlapped phase coil example 504 may provide similar operating capacity. Different variations are possible.

Figure 6:
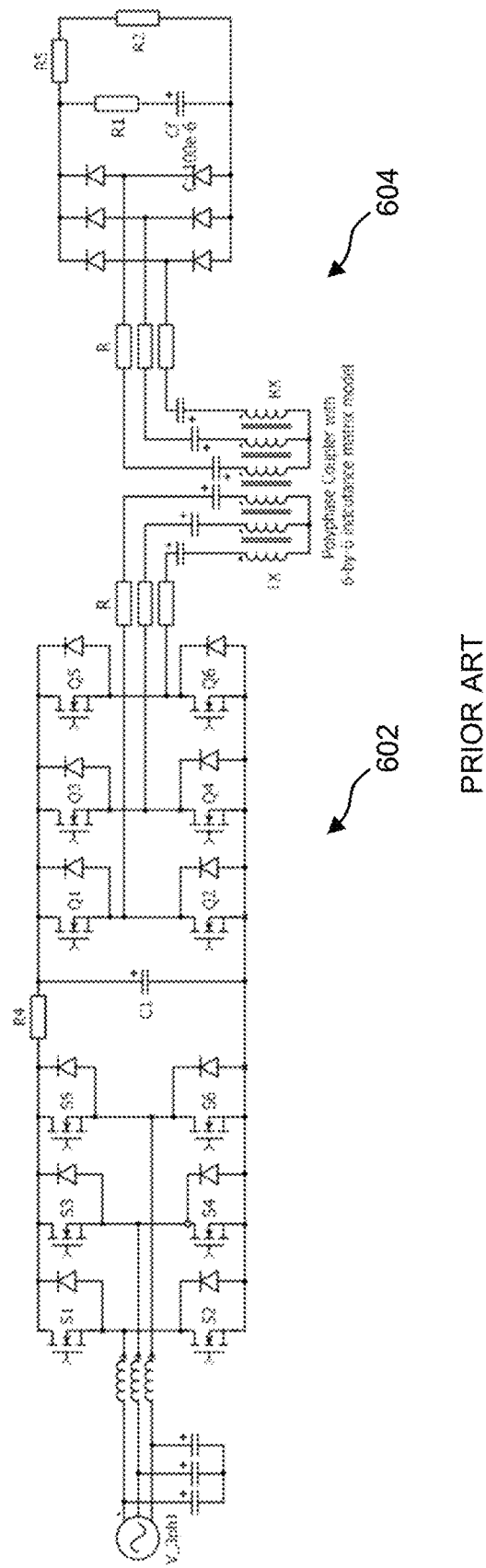
FIG. 6 illustrates a circuit diagram of a standard polyphase WPT arrangement in accordance with various embodiments.

FIG. 6 shows a circuit diagram of a standard polyphase WPT arrangement, as is understood in the prior art. In a similar manner as was illustrated in FIG. 1, the left side illustrates an example transmitter WPT device 602, while the right side illustrates an example receiver WPT device 604. As is shown here, the phase coils of the receiver WPT device 604 are electrically connected in parallel to each other to a common point on one end of each of the phase coils (e.g., in a star arrangement). While this arrangement works very well for polyphase WPT with a mating polyphase transmitter WPT device 602, as is illustrated in FIG. 6, it is not interoperable with a single phase WPT device. This is because the current and voltage induced in each phase coil would be equal between all three phases, and the effective currents would cancel each other out. Thus, such known polyphase WPT arrangements are not interoperable with single phase WPT systems.

In accordance with various embodiments disclosed herein, the present disclosure illustrates approaches to overcome this interoperability problem. A WPT device includes a polyphase coil network including a plurality of phases for transfer of high-frequency AC power, each one of the plurality of phases including a phase coil. The polyphase coil network is configured to operate in a polyphase configuration to enable transfer of polyphase high-frequency AC power with a mating WPT device operating in a polyphase mode. The polyphase coil network is also configured to operate in a single phase interoperability configuration to enable transfer of single phase high-frequency AC power with a mating WPT device operating in a single phase mode.

Figure 7:
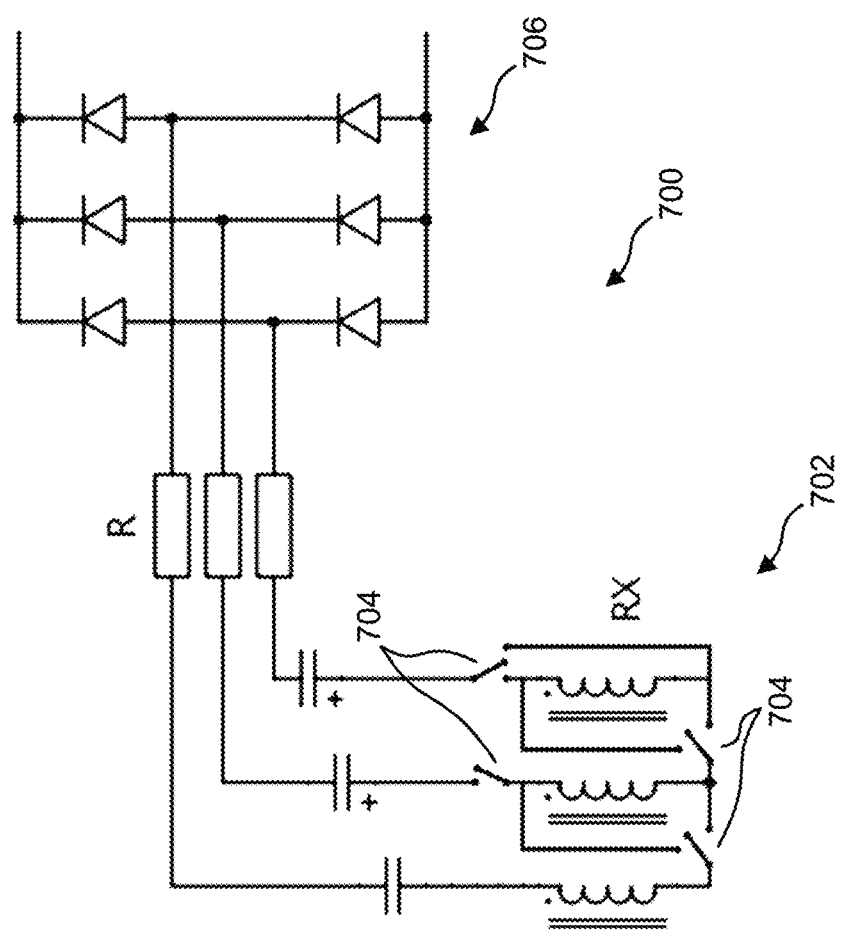
FIG. 7 illustrates a circuit diagram of a receiver WPT device in accordance with various embodiments.
Figure 8:
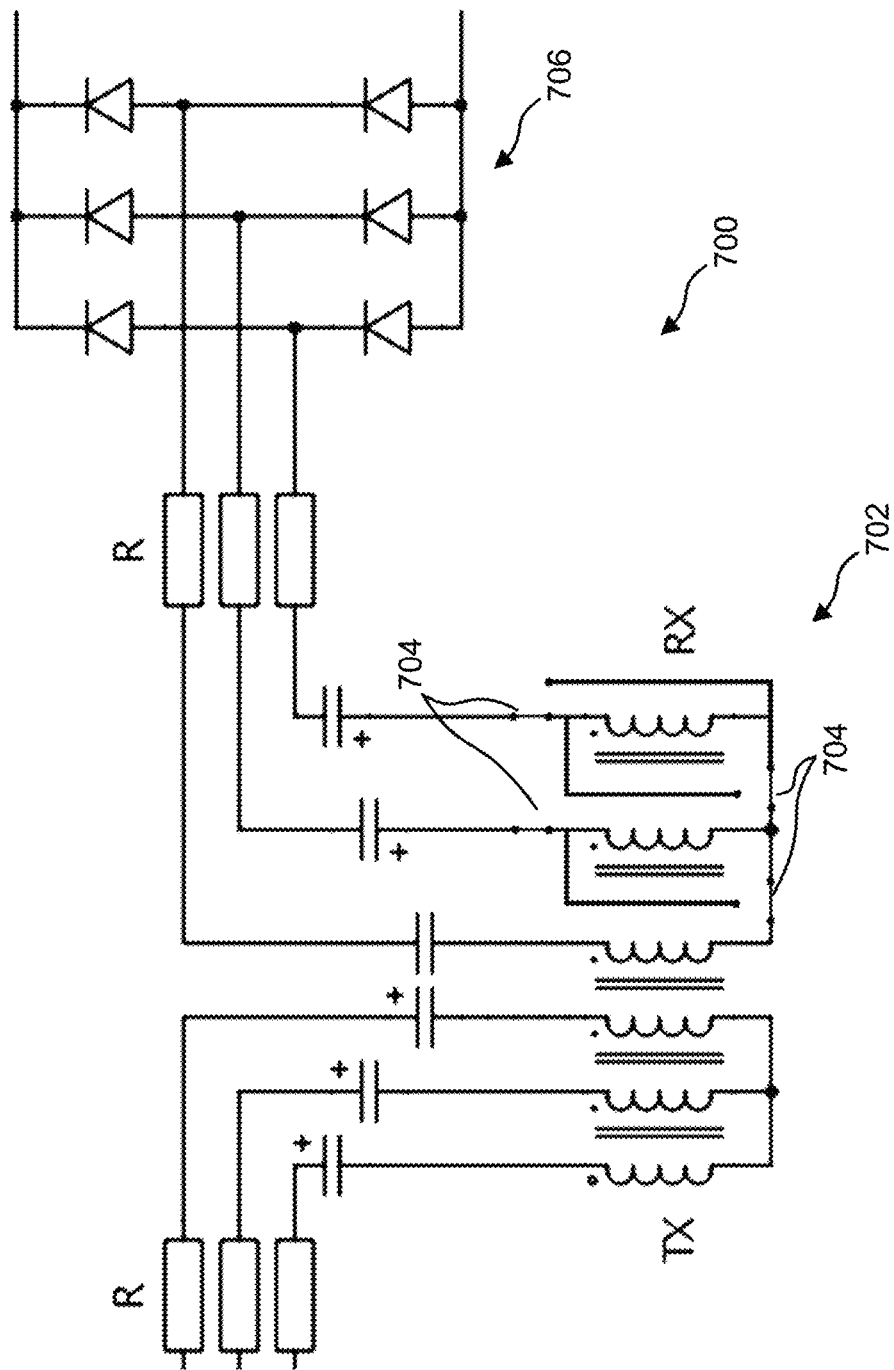
FIG. 8 illustrates a variation of the circuit diagram of the receiver WPT device of FIG. 7 in accordance with various embodiments.
Figure 9:
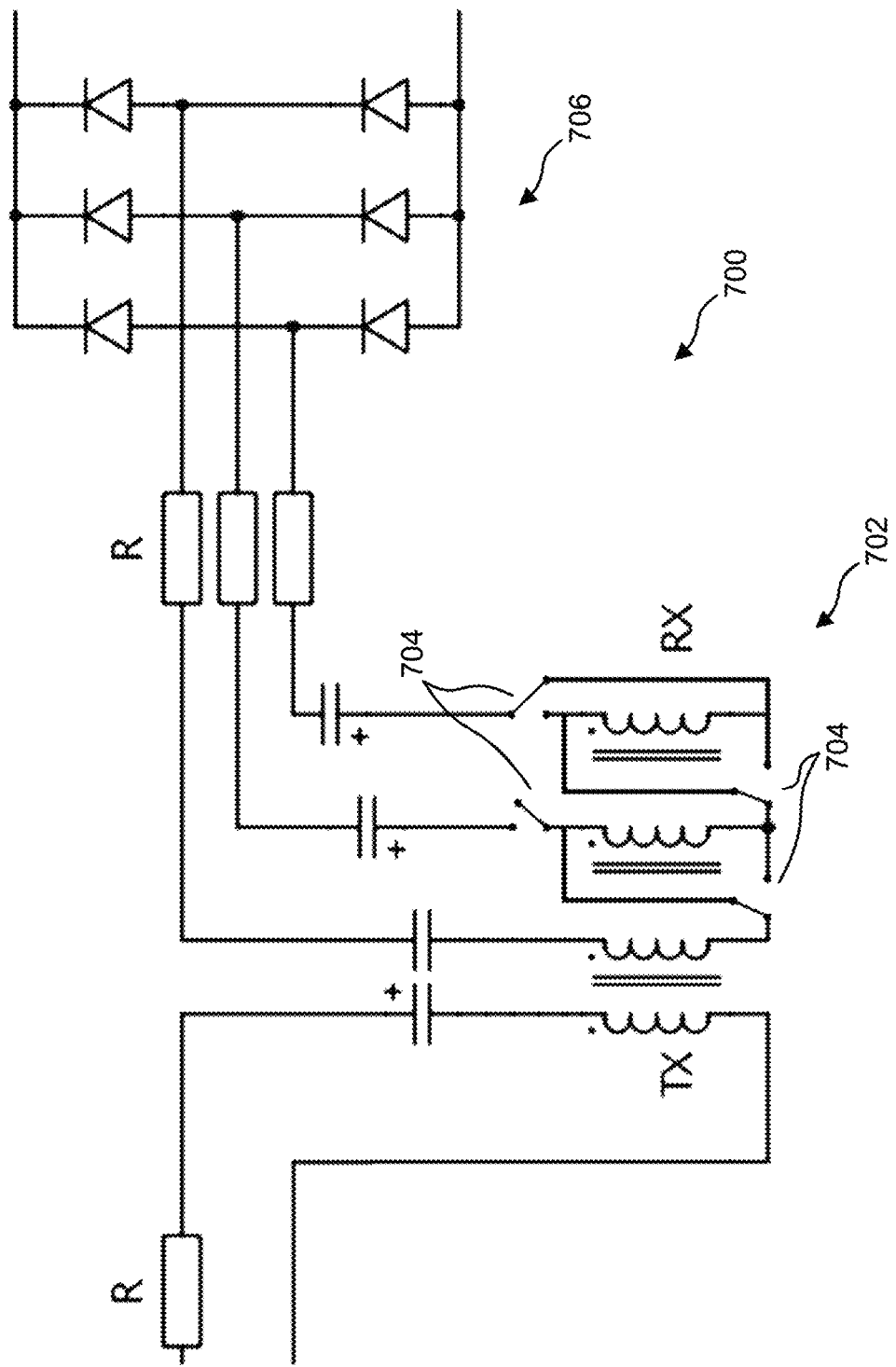
FIG. 9 illustrates a variation of the circuit diagram of the receiver WPT device of FIG. 7 in accordance with various embodiments.

FIGS. 7-9 illustrates one approach to achieve this interoperability in accordance with one embodiment. FIG. 7 illustrates a receiver WPT device 700 having a polyphase coil network 702, and a switching device including a plurality of switches 704. As is shown in FIG. 8, the switches 704 are configured to configure the polyphase coil network 702 in the polyphase configuration by configuring the phase coils of the plurality of phases to be in parallel with one another. For example, the switches 704 may configure the polyphase coil network 702 in the polyphase configuration by configuring each of the phase coils of the plurality of phases such that first ends of each of the phase coils (e.g., the top ends in FIG. 8) are electrically connected to a rectifier 706, and second ends of each of the phase coils (e.g., the bottom ends in FIG. 8) are electrically connected to each other.

Conversely, as shown in FIG. 9, the switches 704 are configured to configure the polyphase coil network 702 in the single phase interoperability configuration by configuring the phase coils of the plurality of phases to be in series with one another. As is shown in FIG. 9, the switches 704 are operated so that the three phase coils are in series with one another, with one end (e.g., the top end) of one of phase coil connected to the rectifier 706, another end (e.g., the bottom end) of another phase coil connected to the rectifier 706, and the third phase coil connected between the other two phase coils in series. By switching the polyphase coil network 702 in series, the polyphase coil network 702 is essentially switched into a large single phase coil in order to be interoperable with a mating single phase WPT device.

While FIGS. 7-9 illustrate the switching concept in the example context of a receiver WPT device 700, the same principles also apply to a transmitter WPT device. The switches 704 may be controlled by the controller 128, 134 or the processing device 130, 136 in response to determining whether the matching WPT device is operating in a polyphase mode or a single phase mode.

Figure 10:
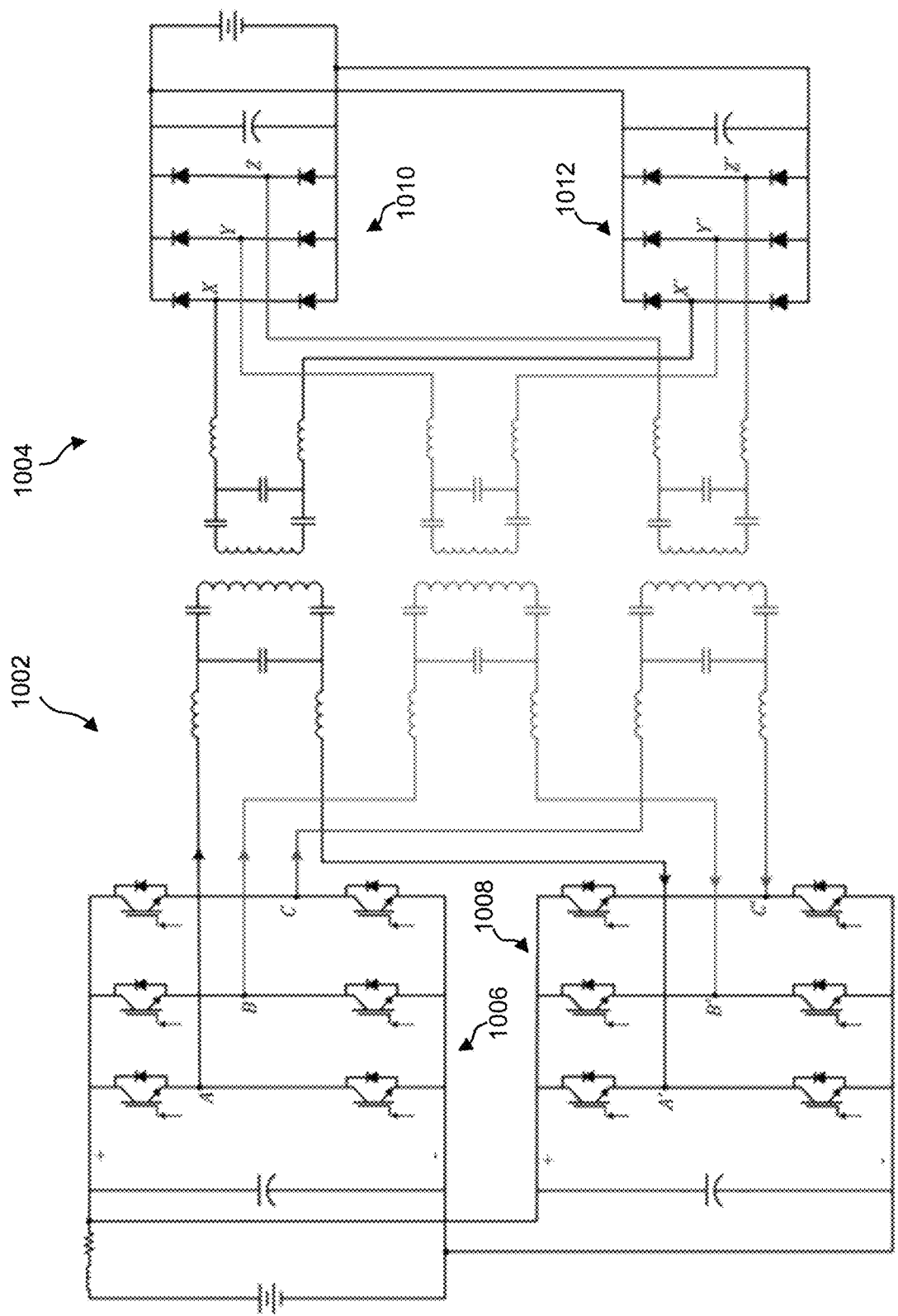
FIG. 10 illustrates a circuit diagram of another WPT arrangement in accordance with various embodiments.

FIG. 10 illustrates another approach to achieve interoperability between single phase and polyphase wireless charging systems in accordance with another embodiment. FIG. 10 shows a transmitter WPT device 1002 on the left and a receiver WPT device 1004 on the right. In this example, both the transmitter WPT device 1002 and the receiver WPT device 1004 are shown with polyphase capabilities, and include three phase coils mated to each other (though other numbers of phase coils are possible). In this embodiment, the transmitter side 1002 utilizes an open-ended inverter structure including a first inverter circuit 1006 electrically connected to one end (e.g., the top end in FIG. 10) of each receiver phase coil, and a second inverter circuit 1008 electrically connected to the other end (e.g., the bottom end in FIG. 10) of each transmitter phase coil. The first inverter circuit 1006 is in parallel with the second inverter circuit 1008 as both are connected across the same incoming power source. Each transmitter phase coil is in parallel with the others, as each is connected between the first inverter circuit 1006 and the second inverter circuit 1008, and each transmitter phase coil is controlled separately from the others. Unlike the traditional interconnected arrangement illustrated in FIG. 6, where one end of each of the transmitter phase coils are electrically connected together, and which arrangement relies on the coil-to-coil voltage produced in the coils, the transmitter phase coils in the embodiment of FIG. 10 are not connected together in the same manner and do not rely on the coil-to-coil voltage in the same manner. As such, the three phase coils of the transmitter WPT device 1002 can be controlled separately to operate in a polyphase manner, wherein each phase is controlled to provide the appropriate polyphase WPT signal. Alternatively, when mated to a single phase WPT receiver, the three phase coils of the transmitter WPT device 1002 can be controlled in an identical or similar manner so that all three phase coils of the transmitter WPT device 1002 work together to provide a single phase charging signal.

A WPT device in accordance with this embodiment may include an open-ended dual inverter comprising a first inverter and a second inverter in parallel with the first inverter, wherein each phase coil of the plurality of phases are in parallel with each other and has a first end electrically connected to the first inverter and a second end electrically connected to the second inverter.

Similarly, in this embodiment, the receiver WPT device 1004 side utilizes an open-ended rectifier structure including a first rectifier circuit 1010 electrically connected to one end (e.g., the top end in FIG. 10) of each receiver phase coil, and a second rectifier circuit 1012 electrically connected to the other end (e.g., the bottom end in FIG. 10) of each receiver phase coil. The first rectifier circuit 1010 is in parallel with the second rectifier circuit 1012 as both are connected across the same rectifier voltage outputs. Each receiver phase coil is in parallel with the others, as each is connected between the first rectifier circuit 1010 and the second rectifier circuit 1012, and each receiver phase coil operates separately from the others. Unlike the traditional interconnected arrangement illustrated in FIG. 6, where one end of each of the receiver phase coils are electrically connected together, and which arrangement relies on the phase-to-phase voltage produced in the coils, the receiver phase coils in the embodiment of FIG. 10 are not connected together in the same manner and do not rely on the coil-to-coil voltage in the same manner. As such, the three phase coils of the receiver WPT device 1004 each have a dedicated full-bridge rectifier for each phase. Accordingly, each phase is handled separately and the open-ended rectifier circuit arrangement does not rely on the phase-to-phase voltage across the coils. Because each phase is handled separately, the receiver coils can operate in a polyphase manner, wherein each phase receives the appropriate polyphase WPT signal. Alternatively, when mated to a single phase WPT transmitter, the three phase coils of the receiver WPT device 1004 can operate in an identical or similar manner so that all three phase coils of the receiver WPT device 1004 each receive the single phase charging signal and so that charge is passed through the open-ended rectifier and ultimately to the battery. Due to the open-ended arrangement, the polyphase coils do not rely on a phase-to-phase voltage across the different coils. Instead, because each phase is handled separately, each coil can have a same or similar voltage across it generated by a single phase WPT signal, which power can ultimately be received and stored.

A WPT device in accordance with this embodiment may include an open-ended dual rectifier comprising a first rectifier and a second rectifier in parallel with the first rectifier, wherein each phase coil of the plurality of phases are in parallel with each other and has a first end electrically connected to the first rectifier and a second end electrically connected to the second rectifier.

The example of FIG. 10 shows matched systems, where both the transmitter side 1002 and the receiver side 1004 implement polyphase WPT and both utilize the open-ended inverter/rectifier configurations discussed above. However, it is important to understand that either the transmitter side 1002 or the receiver side 1004 can be utilized, and either can be mated to other polyphase WPT transmitters/receivers that do not utilize the discussed open-ended inverter/rectifier configurations. Importantly, in order to provide interoperability, either the transmitter side 1002 or the receiver side 1004 can be mated to single phase WPT transmitters/receivers as well.

Figure 11:
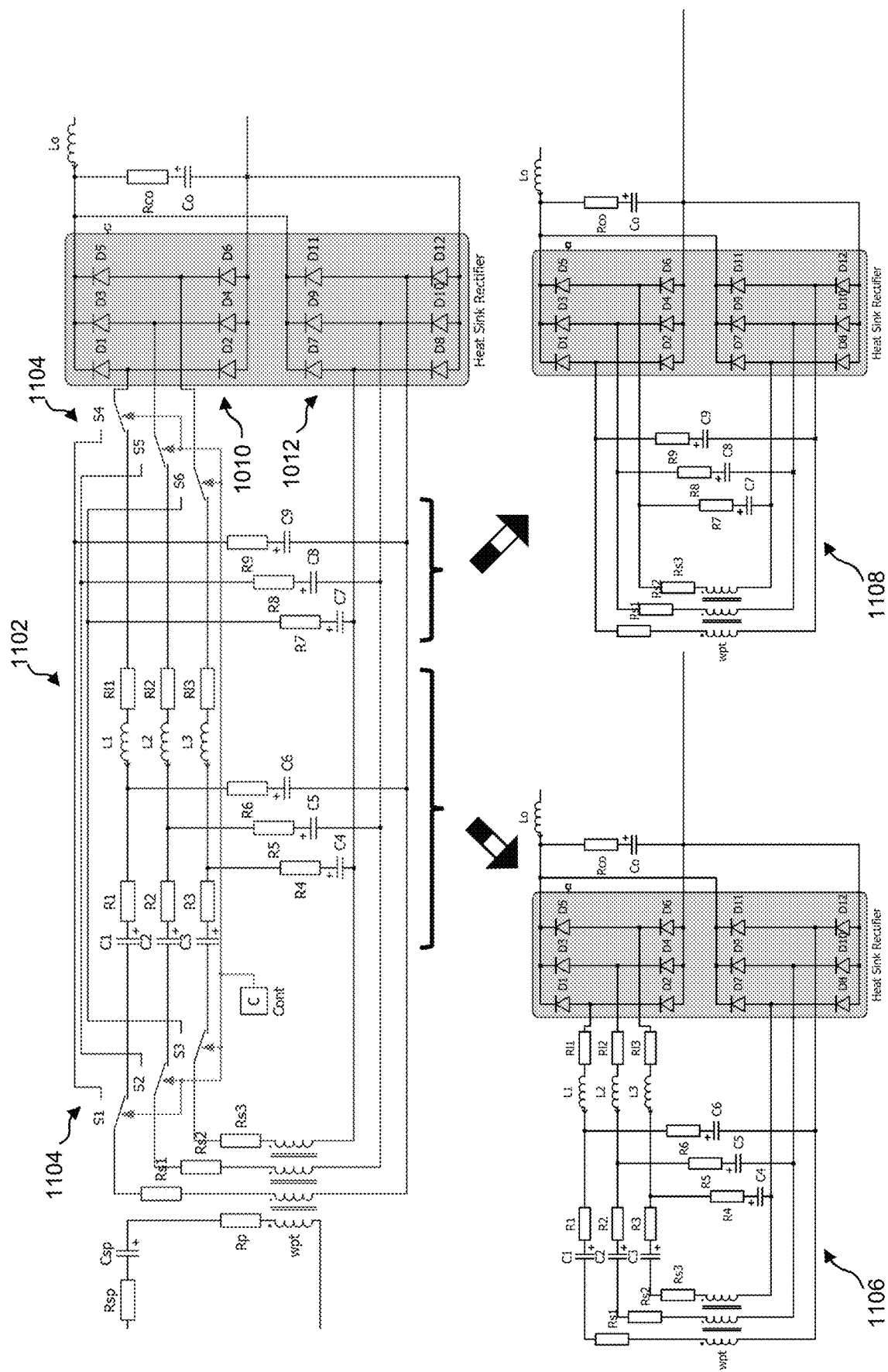
FIG. 11 illustrates a circuit diagram of another polyphase WPT arrangement in accordance with various embodiments.

FIG. 11 illustrates an example of a modification of the open-ended inverter/rectifier configurations discussed above, in accordance with various embodiments. In various embodiments, a WPT device may include a hybrid tuning network 1102, which may be switched into different configurations dependent on whether the device is operating in the polyphase configuration or the single phase interoperability configuration. FIG. 11 illustrates an example open-ended rectifier configuration for a receiver side, illustrating the first rectifier circuit 1010 and the second rectifier circuit 1012, as well as a hybrid tuning network 1102 (which may also be called a hybrid compensation network or a hybrid resonant network) is also illustrated. Also, a hybrid tuning network switching device 1104 comprising one or more switches is included. The hybrid tuning network switching device 1104 is configured to configure the hybrid tuning network 1102 in a first circuit arrangement 1106 when the polyphase coil network is configured to operate in the polyphase configuration. The hybrid tuning network switching device 1104 is also configured to configure the hybrid tuning network 1102 in a second circuit arrangement 1108 when the polyphase coil network is configured to operate in the single phase interoperability configuration.

As is shown in FIG. 11, the first circuit arrangement 1106 and the second circuit arrangement 1108 are illustrated as equivalent circuits when the switches of the hybrid tuning network switching device 1104 are switched into a first position or a second position. The first circuit arrangement 1106 of the hybrid tuning network 1102 may include the resonant network in an LCC configuration, with each phase having a capacitor and an inductor in in series with the coil, and a second capacitor in parallel with the coil. Each phase of the LCC configuration of the resonant network in turn is in parallel with the LCC configurations of the resonant networks for the other phases. The resonant network may also be an LCL configuration, an LLC configuration, or series capacitor networks, in other examples.

The second circuit arrangement 1108 of the hybrid tuning network 1102 may include the resonant network in a parallel resonant network configuration, with each phase having at least a capacitor in parallel (P) with the coil. Each phase of the parallel (P) configuration of the resonant network in turn is in parallel with the parallel (P) configurations of the resonant networks for the other phases.

In various embodiments, whether the mating transmitter side is operating in a polyphase or single phase mode, the transmitter side may also be configured in an LCC configuration. In this manner, the combined system may include LCC-LCC tuning for a polyphase mode of operation, and an LCC-P tuning for a single phase mode of operation. It has been determined that such an LCC-LCC resonant network arrangement may be best suited for WPT with a polyphase transmitter, while an LCC-P resonant network arrangement may be best suited for WPT with a single phase transmitter.

The switches of the hybrid tuning network switching device 1104 may be controlled by the controller 128, 134 or the processing device 130, 136 in response to determining whether the matching WPT device is operating in a polyphase mode or a single phase mode. These switches may be solid state relays, electromechanical contactors, or semiconductor switches.

Figure 12:
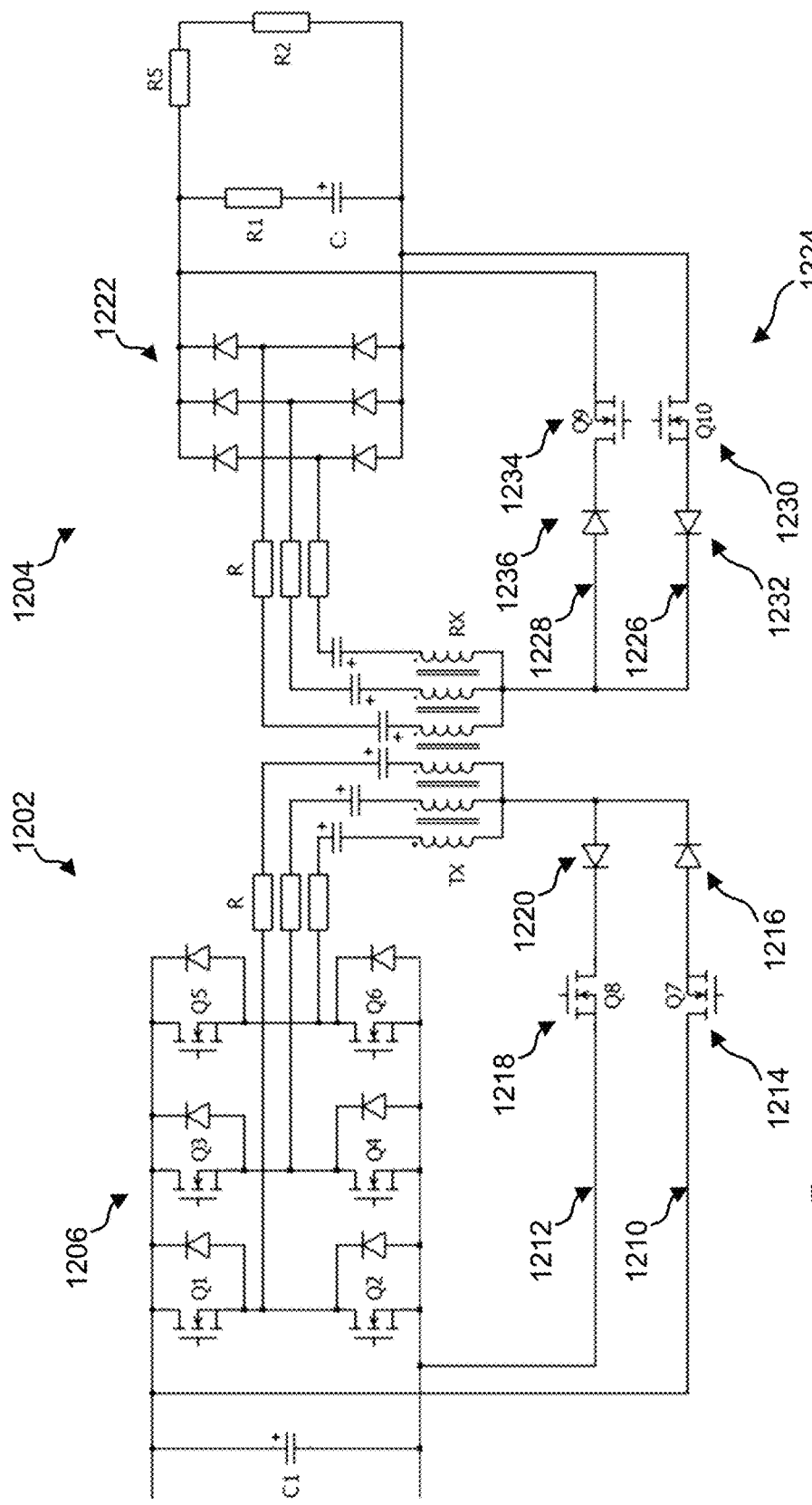
FIG. 12 illustrates a circuit diagram of another polyphase WPT arrangement in accordance with various embodiments.

FIG. 12 illustrates another approach to achieve interoperability between single phase and polyphase wireless charging systems in accordance with another embodiment. FIG. 12 shows a transmitter WPT device 1202 on the left and a receiver WPT device 1204 on the right. In this example, both the transmitter WPT device 1202 and the receiver WPT device 1204 are shown with polyphase capabilities, and include three phase coils mated to each other (though other numbers of phase coils are possible). In this embodiment, the transmitter side 1202 includes an inverter 1206, compensation network, and multiple phase coils to enable polyphase WPT. The inverter 1206 includes high and low power inputs, and is electrically connected (e.g., directly or through the compensation network) to first ends (e.g., top ends in FIG. 12) of each of the phase coils. In addition, the transmitter side 1202 includes a switch circuit 1208 that is electrically connected to the second ends (e.g., bottom ends in FIG. 12) of each of the phase coils, where the second ends of the phase coils are also electrically connected together.

The switch circuit 1208 may include a first path 1210 and a second path 1212 in parallel. The first path 1210 may include a first switch 1214 and a first diode 1216 configured to allow the current to pass from the high input of the inverter 1206 to the second ends of each of the phase coils to induce a positive current in the phase coils. The second path 1212 may include a second switch 1218 and a second diode 1220 configured to allow the current to pass from the second ends of each of the phase coils to the low input of the inverter to induce a negative current in the phase coils.

When the transmitter side 1202 is operated in a polyphase mode (e.g., when mated with a polyphase WPT receiver), each of the switches 1214 and 1218 may remain off, thereby allowing the circuit to operate similarly to the standard polyphase WPT charging device arrangement illustrated in FIG. 6, with the phase coils electrically connected in parallel to each other to a common point on one end of each of the phase coils (e.g., in a star arrangement). However, when the transmitter side 1202 is operated in a single phase mode (e.g., when mated with a single phase WPT receiver), the switch circuit 1208 may be operated as stated above, with the switches 1214 and 1218 alternatively being switched on depending on whether a positive or negative current is being induced in the phase coils. In this manner, the example transmitter WPT device 1202 can be intraoperative with either a polyphase WPT receiver or a single phase WPT receiver.

In a similar manner, the receiver side 1204 includes a rectifier circuit 1222, a compensation network, and multiple phase coils to enable polyphase WPT. The rectifier 1222 includes high and low power outputs, and is electrically connected (e.g., directly or through the compensation network) to first ends (e.g., top ends in FIG. 12) of each of the phase coils of the receiver side 1204. In addition, the receiver side 1204 includes a switch circuit 1224 that is electrically connected to the second ends (e.g., bottom ends in FIG. 12) of each of the phase coils of the receiver side 1204, where the second ends of the phase coils are also electrically connected together.

The switch circuit 1224 may include a first path 1226 and a second path 1228 in parallel. The first path 1226 may include a first switch 1230 and a first diode 1232 configured to allow the current to pass from the low output of the rectifier 1222 to the second ends of each of the phase coils when a positive current is induced in the phase coils of the receiver side 1204. The second path 1228 may include a second switch 1234 and a second diode 1236 configured to allow current to pass from the second ends of each of the phase coils to the high output of the rectifier when a negative current is induced in the phase coils of the receiver side 1204.

When the receiver side 1204 is operated in a polyphase mode (e.g., when mated with a polyphase WPT receiver), each of the switches 1230 and 1234 may remain off, thereby allowing the receiver 1204 to operate similarly to the standard polyphase WPT charging device arrangement illustrated in FIG. 6, with the phase coils electrically connected in parallel to each other to a common point on one end of each of the phase coils (e.g., in a star or Wye arrangement). However, when the receiver side 1204 is operated in a single phase interoperability configuration (e.g., when mated with a single phase WPT transmitter), the switch circuit 1224 may be operated as stated above, with the switches 1230 and 1234 alternatively being switched on depending on whether a positive or negative current is being induced in the phase coils by the mating single phase WPT transmitter. In this manner, the example receiver WPT device 1204 can be intraoperative with either a polyphase WPT transmitter or a single phase WPT transmitter.

The example of FIG. 12 shows matched systems, where both the transmitter side 1202 and the receiver side 1204 implement polyphase WPT and both utilize the interoperability switch circuit embodiments discussed above. However, it is important to understand that either the transmitter side 1202 or the receiver side 1204 can be utilized, and either can be mated to other polyphase WPT transmitters/receivers that do not utilize the interoperability switch circuit embodiments discussed above. Importantly, in order to provide interoperability, either the transmitter side 1202 or the receiver side 1204 can be mated to single phase WPT transmitters/receivers as well.

Figure 13:
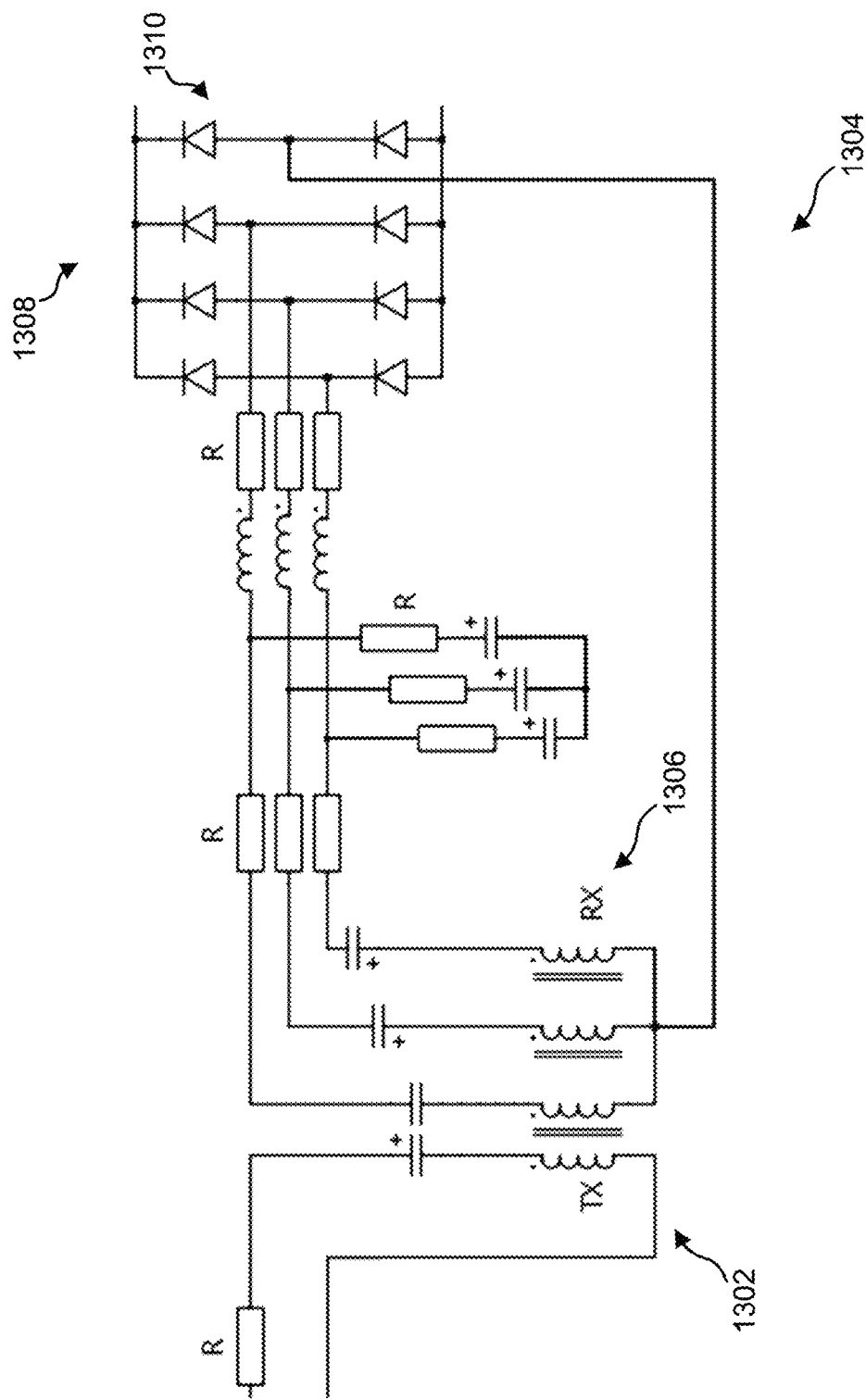
FIG. 13 illustrates a circuit diagram of another polyphase WPT arrangement in accordance with various embodiments.

FIG. 13 illustrates another approach to achieve interoperability between single phase and polyphase wireless charging systems in accordance with another embodiment. FIG. 13 shows a transmitter WPT coil 1302 of a transmitter WPT device on the left, and a receiver WPT device 1304 on the right. The receiver WPT device 1304 includes a plurality of phases (e.g., three) and having a plurality of phase coils 1306. The receiver WPT device 1304 is configured to operate in a polyphase configuration or a single phase interoperability configuration, as discussed below. In this embodiment, the receiver WPT device 1304 includes a rectifier circuit 1308, having a plurality of rectifier legs, each electrically connected (e.g., directly or through a compensation network) to first ends (e.g., the top ends in FIG. 13) of each of the phase coils 1306 of the plurality of phases. The rectifier circuit 1308 also has an additional rectifier leg 1310 (e.g., a fourth leg) electrically connected to second ends (e.g., the bottom ends in FIG. 13 or the neutral point) of each of the phase coils 1306 of the plurality of phases, wherein the second ends are electrically connected together. The plurality of rectifier legs of the rectifier circuit 1308 and the additional rectifier leg 1310 of the rectifier circuit 1308 are all in parallel with each other between a positive output and a negative output of the rectifier circuit 1308.

In this embodiment, by virtue of the additional rectifier leg 1310 (e.g., the fourth leg), a return path is provided for rectifying pulses across the phase coils 1306, particularly when operating in a single phase WPT mode when mated to a single phase transmitter coil (as illustrated in FIG. 13). However, when operating in a polyphase WPT mode when mated to a polyphase transmitter coil (e.g., as shown in FIG. 12), because the second ends of the phase coils 1306 are electrically coupled together, the phase coils 1306 can operate in a similar manner to the standard polyphase phase coils of the example receiver WPT device 604 illustrated in FIG. 6. As such, the depicted rectifier circuit 1308 enables the receiver WPT device 1304 to be operated in either a polyphase configuration or a single phase interoperability configuration. FIG. 13 shows a transmitter WPT coil 1302 on the left. The example transmitter WPT coil 1302 is illustrated as a single phase coil. However, as is the case with the other embodiments herein, the receiver WPT device 1304 in this example is interoperable with either a single phase WPT transmitter system or a polyphase WPT transmitter system, as such interoperability is one of the primary goals of the present disclosure and the embodiment of FIG. 13.

Figure 14:
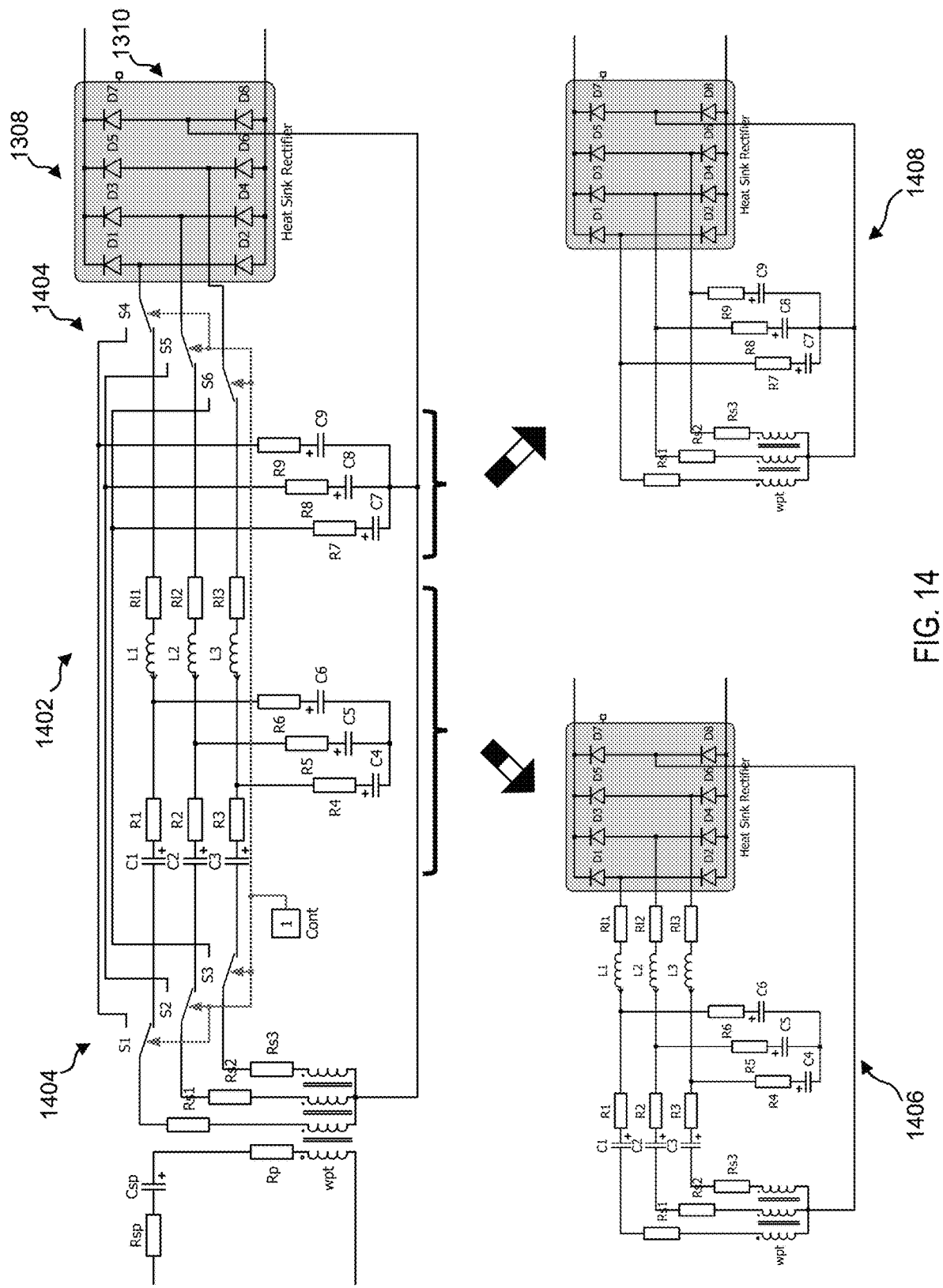
FIG. 14 illustrates a circuit diagram of another polyphase WPT arrangement in accordance with various embodiments.

FIG. 14 illustrates an example of a modification of the receiver WPT device with the rectifier circuit 1308 including the additional rectifier leg 1310 discussed above, in accordance with various embodiments. In various embodiments, the receiver WPT device may include a hybrid tuning network 1402 (which may also be called a hybrid compensation network or a hybrid resonant network), which may be switched into different configurations dependent on whether the device is operating in a polyphase configuration or a single phase interoperability configuration. Also, a hybrid tuning network switching device 1404 comprising one or more switches is included. The hybrid tuning network 1402 and/or the hybrid tuning network switching device 1404 may be identical or similar to the hybrid tuning network 1102 and/or the hybrid tuning network switching device 1104 discussed above with respect to FIG. 11. The hybrid tuning network switching device 1404 is configured to configure the hybrid tuning network 1402 in a first circuit arrangement 1406 when the polyphase coil network is configured to operate in the polyphase configuration. The hybrid tuning network switching device 1404 is also configured to configure the hybrid tuning network 1402 in a second circuit arrangement 1408 when the polyphase coil network is configured to operate in the single phase interoperability configuration.

As is shown in FIG. 14 (in a similar manner to FIG. 11), the first circuit arrangement 1406 and the second circuit arrangement 1408 are illustrated as equivalent circuits when the switches of the hybrid tuning network switching device 1404 are switched into a first position or a second position. The first circuit arrangement 1406 of the hybrid tuning network 1402 may include the resonant network in an LCC configuration, with each phase having a capacitor and an indictor in in series with the coil, and a second capacitor in parallel with the coil. Each phase of the LCC configuration of the resonant network in turn is in parallel with the LCC configurations of the resonant networks for the other phases.

The second circuit arrangement 1408 of the hybrid tuning network 1402 may include the resonant network in a parallel resonant network configuration, with each phase having at least a capacitor in parallel (P) with the coil. Each phase of the parallel (P) configuration of the resonant network in turn is in parallel with the parallel (P) configurations of the resonant networks for the other phases.

In various embodiments, whether the mating transmitter side is operating in a polyphase or single phase mode, the transmitter side may also be configured in an LCC configuration. In this manner, the combined system may include LCC-LCC tuning for a polyphase mode of operation, and an LCC-P tuning for a single phase mode of operation. It has been determined that such an LCC-LCC resonant network arrangement may be best suited for WPT with a polyphase transmitter, while an LCC-P resonant network arrangement may be best suited for WPT with a single phase transmitter.

The switches of the hybrid tuning network switching device 1404 may be solid-state relays, electromechanical contactors, or semiconductor switches and can be controlled by the controller 128, 134 or the processing device 130, 136 in response to determining whether the matching WPT device is operating in a polyphase mode or a single phase mode.

In accordance with various embodiments, a method is disclosed for wireless power transfer (WPT) between a first WPT device and a second WPT device, wherein the first WPT device includes a polyphase coil network. The method includes determining, by the first WPT device (e.g., a controller 128, 134 or processing device 130, 136 of the first WPT device) whether the second WPT device is operating in a polyphase mode or a single phase mode. The method also includes operating the polyphase coil network of the first WPT device in a polyphase configuration to enable transfer of polyphase high-frequency AC power with the second WPT device in response to determining that the second WPT device is operating in the polyphase mode. The method also includes operating the polyphase coil network of the first WPT device in a single phase interoperability configuration to enable transfer of single phase high-frequency AC power with the second WPT device operating in the single phase mode.

Other methods may include configuring, by a switching device comprising at least one switch, the polyphase coil network in the single phase interoperability configuration by configuring the phase coils of the plurality of phases to be in series with one another, and/or configuring the polyphase coil network in the polyphase configuration by configuring the phase coils of the plurality of phases to be in parallel with one another. The method may also include configuring the polyphase coil network in the polyphase configuration by configuring, by the switching device, each of the phase coils of the plurality of phases such that first ends of each of the phase coils are electrically connected to a rectifier, and second ends of each of the phase coils are electrically connected to each other.

In other embodiments, the method may include using an open-ended dual rectifier (and/or inverter) comprising a first rectifier (or inverter) and a second rectifier (or inverter) in parallel with the first rectifier, wherein each phase coil of the plurality of phases are in parallel with each other and has a first end electrically connected to the first rectifier and a second end electrically connected to the second rectifier. The method may also include, when the WPT device is a receiver and the mating WPT device is a transmitter, configuring a hybrid tuning network using a hybrid tuning network switching device comprising at least one switch, in a first circuit arrangement when the polyphase coil network is configured to operate in the polyphase configuration, and configuring the hybrid tuning network in a second circuit arrangement when the polyphase coil network is configured to operate in the single phase interoperability configuration.

In various embodiments, the method may include using a rectifier (and/or inverter) circuit electrically connected to first ends of each of the phase coils of the plurality of phases, and comprising a high output and a low output, and alternatingly operating a switch circuit electrically connected to second ends of each of the phase coils to allow current to pass from the low output of the rectifier to the second ends of each of the phase coils when a positive current is induced in the phase coils, and to allow current to pass from the second ends of each of the phase coils to the high output of the rectifier when a negative current is induced in the phase coils. The switch circuit may include a first path and a second path in parallel, wherein the first path comprises a first switch and a first diode configured to allow the current to pass from the low output of the rectifier to the second ends of each of the phase coils when the positive current is induced in the phase coils, and wherein the second path comprises a second switch and a second diode configured to allow the current to pass from the second ends of each of the phase coils to the high output of the rectifier when the negative current is induced in the phase coils.

In various embodiments, the method may include using a rectifier circuit including a plurality of rectifier legs, each electrically connected to first ends of each of the phase coils of the plurality of phases, and an additional rectifier leg electrically connected to second ends of each of the phase coils of the plurality of phases, wherein the second ends are electrically connected together, wherein the plurality of rectifier legs and the additional rectifier leg are all in parallel with each other between a positive output and a negative output of the rectifier circuit. The method may also include, when the WPT device is a receiver and the mating WPT device is a transmitter, configuring a hybrid tuning network using a hybrid tuning network switching device comprising at least one switch, in a first circuit arrangement when the polyphase coil network is configured to operate in the polyphase configuration, and configuring the hybrid tuning network in a second circuit arrangement when the polyphase coil network is configured to operate in the single phase interoperability configuration.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wireless power transfer (WPT) device comprising:
a polyphase coil network comprising a plurality of phases for transfer of high-frequency AC power, each one of the plurality of phases comprising a phase coil,
wherein the polyphase coil network is configured to:
operate in a polyphase configuration to enable transfer of polyphase high-frequency AC power with a mating WPT device operating in a polyphase mode; and
operate in a single phase interoperability configuration to enable transfer of single phase high-frequency AC power with a mating WPT device operating in a single phase mode.

2. The WPT device according to claim 1, comprising:
a switching device comprising at least one switch configured to:
configure the polyphase coil network in the single phase interoperability configuration by configuring the phase coils of the plurality of phases to be in series with one another; and
configure the polyphase coil network in the polyphase configuration by configuring the phase coils of the plurality of phases to be in parallel with one another.

3. The WPT device according to claim 2:
wherein the switching device is configured to:
configure the polyphase coil network in the polyphase configuration by configuring each of the phase coils of the plurality of phases such that first ends of each of the phase coils are electrically connected to a rectifier, and second ends of each of the phase coils are electrically connected to each other.

4. The WPT device according to claim 1, comprising:
an open-ended dual rectifier comprising a first rectifier and a second rectifier in parallel with the first rectifier,
wherein each phase coil of the plurality of phases are in parallel with each other and has a first end electrically connected to the first rectifier and a second end electrically connected to the second rectifier.

5. The WPT device according to claim 4,
wherein the WPT device is a receiver and the mating WPT device is a transmitter,
the WPT device comprising:
a hybrid tuning network; and
a hybrid tuning network switching device comprising at least one switch configured to:
configure the hybrid tuning network in a first circuit arrangement when the polyphase coil network is configured to operate in the polyphase configuration; and
configure the hybrid tuning network in a second circuit arrangement when the polyphase coil network is configured to operate in the single phase interoperability configuration.

6. The WPT device according to claim 1, comprising:
a rectifier circuit electrically connected to first ends of each of the phase coils of the plurality of phases, and comprising a high output and a low output; and
a switch circuit electrically connected to second ends of each of the phase coils;
wherein the switch circuit is configured to, alternatingly:
allow current to pass from the low output of the rectifier to the second ends of each of the phase coils when a positive current is induced in the phase coils; and
allow current to pass from the second ends of each of the phase coils to the high output of the rectifier when a negative current is induced in the phase coils.

7. The WPT device according to claim 6,
wherein the switch circuit comprises a first path and a second path in parallel,
wherein the first path comprises a first switch and a first diode configured to allow the current to pass from the low output of the rectifier to the second ends of each of the phase coils when the positive current is induced in the phase coils, and
wherein the second path comprises a second switch and a second diode configured to allow the current to pass from the second ends of each of the phase coils to the high output of the rectifier when the negative current is induced in the phase coils.

8. The WPT device according to claim 1,
wherein the WPT device is a receiver and the mating WPT device is a transmitter,
the WPT device comprising:
a rectifier circuit comprising:
   a plurality of rectifier legs, each electrically connected to first ends of each of the phase coils of the plurality of phases; and
   an additional rectifier leg electrically connected to second ends of each of the phase coils of the plurality of phases, wherein the second ends are electrically connected together,
   wherein the plurality of rectifier legs and the additional rectifier leg are all in parallel with each other between a positive output and a negative output of the rectifier circuit.

9. The WPT device according to claim 8, comprising:
a hybrid tuning network; and
a hybrid tuning network switching device comprising at least one switch configured to:
   configure the hybrid tuning network in a first circuit arrangement when the polyphase coil network is configured to operate in the polyphase configuration; and
   configure the hybrid tuning network in a second circuit arrangement when the polyphase coil network is configured to operate in the single phase interoperability configuration.

10. The WPT device according to claim 1,
wherein each phase coil of each one of the plurality of phases is unipolar.

11. The WPT device according to claim 1,
wherein current flows in a same rotational direction in each phase coil of each one of the plurality of phases.

12. The WPT device according to claim 1,
wherein the plurality of phases include three phases.

13. The WPT device according to claim 1,
wherein the polyphase coil network comprises a single layer polyphase coil network.

14. The WPT device according to claim 1,
wherein the polyphase coil network comprises a circular footprint layout, where each phase occupies approximately 120 degrees of the circular footprint layout.

15. The WPT device according to claim 1,
wherein the WPT device is a receiver and the mating WPT device is a transmitter.

16. The WPT device according to claim 15,
wherein the polyphase coil network has a smaller area than a coil network of the mating WPT device operating as the transmitter.

17. The WPT device according to claim 1,
wherein the WPT device is a transmitter and the mating WPT device is a receiver.

18. The WPT device according to claim 17,
wherein the polyphase coil network has a larger area than a coil network of the mating WPT device operating as the receiver.

19. The WPT device according to claim 1, comprising:
a controller configured to determine whether the mating WPT device is operating in the single phase mode or the polyphase mode.

20. The WPT device according to claim 19,
wherein the controller is configured to communicate with the mating WPT device to determine whether the mating WPT device is operating in the single phase mode or the polyphase mode.

21. The WPT device according to claim 19, comprising:
wherein the controller configured to measure a phase shift between the plurality of phases to determine whether the mating WPT device is operating in the single phase mode or the polyphase mode.

22. A method for wireless power transfer (WPT) between a first WPT device and a second WPT device, wherein the first WPT device includes a polyphase coil network, the method comprising:
   determining, by the first WPT device whether the second WPT device is operating in a polyphase mode or a single phase mode;
   operating the polyphase coil network of the first WPT device in a polyphase configuration to enable transfer of polyphase high-frequency AC power with the second WPT device in response to determining that the second WPT device is operating in the polyphase mode; and
   operating the polyphase coil network of the first WPT device in a single phase interoperability configuration to enable transfer of single phase high-frequency AC power with the second WPT device operating in the single phase mode.

\* \* \* \* \*